US010647928B2

(12) United States Patent
Moloney

(10) Patent No.: US 10,647,928 B2
(45) Date of Patent: May 12, 2020

(54) IN-LINE CHEMICAL HEATING FOR IN-SITU GENERATION OF ACTIVE CHEMICALS

(71) Applicant: Ecolab USA Inc., St. Paul, MN (US)

(72) Inventor: Jeremy Moloney, Katy, TX (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

(21) Appl. No.: 16/193,066

(22) Filed: Nov. 16, 2018

(65) Prior Publication Data

US 2019/0153333 A1 May 23, 2019

Related U.S. Application Data

(60) Provisional application No. 62/588,554, filed on Nov. 20, 2017, provisional application No. 62/650,770, filed on Mar. 30, 2018.

(51) Int. Cl.
| | |
|---|---|
| C10G 29/24 | (2006.01) |
| C09K 15/06 | (2006.01) |
| C09K 15/02 | (2006.01) |
| A01N 35/02 | (2006.01) |
| C10L 1/00 | (2006.01) |
| C10L 3/00 | (2006.01) |
| C10L 10/04 | (2006.01) |
| C10G 75/02 | (2006.01) |
| C23F 11/12 | (2006.01) |
| C10L 10/02 | (2006.01) |
| B01F 5/04 | (2006.01) |
| A01N 31/02 | (2006.01) |
| C10G 75/04 | (2006.01) |
| C23F 11/10 | (2006.01) |
| C23F 11/08 | (2006.01) |
| C23F 11/18 | (2006.01) |
| C23F 15/00 | (2006.01) |
| B05D 7/22 | (2006.01) |
| B05D 5/00 | (2006.01) |
| B05D 3/00 | (2006.01) |
| B05D 7/14 | (2006.01) |

(52) U.S. Cl.
CPC ............ *C10G 29/24* (2013.01); *A01N 31/02* (2013.01); *A01N 35/02* (2013.01); *B01F 5/04* (2013.01); *B05D 3/002* (2013.01); *B05D 5/00* (2013.01); *B05D 5/005* (2013.01); *B05D 7/14* (2013.01); *B05D 7/146* (2013.01); *B05D 7/222* (2013.01); *B05D 7/225* (2013.01); *C09K 15/02* (2013.01); *C09K 15/06* (2013.01); *C10G 75/02* (2013.01); *C10G 75/04* (2013.01); *C10L 1/00* (2013.01); *C10L 3/00* (2013.01); *C10L 10/02* (2013.01); *C10L 10/04* (2013.01); *C23F 11/08* (2013.01); *C23F 11/10* (2013.01); *C23F 11/12* (2013.01); *C23F 11/122* (2013.01); *C23F 11/181* (2013.01); *C23F 15/00* (2013.01); *B05D 2202/00* (2013.01); *B05D 2254/04* (2013.01); *C09K 2208/32* (2013.01); *C10G 2300/207* (2013.01); *C10G 2300/4037* (2013.01); *C10L 2200/0263* (2013.01); *C10L 2290/141* (2013.01); *C10L 2290/54* (2013.01)

(58) Field of Classification Search
CPC .......... B05D 3/002; B05D 5/00; B05D 5/005; B05D 7/14; B05D 7/146; B05D 7/222; B05D 7/225; B05D 2202/00; B05D 2254/04; C10G 29/24; C10G 75/02; C10G 2300/4037; C10L 10/02; C10L 10/04; C10L 3/00; C10L 1/00; C10L 2200/0263; C10L 2300/207; C10L 2290/54; C10L 2290/141; C10L 75/04; C23F 11/12; C23F 15/00; C23F 11/181; C23F 11/122; C23F 11/10; C23F 11/08; A01N 35/00; A01N 31/02; C09K 15/02; C09K 15/06; C09K 2208/32; B01F 5/04
USPC .............................. 427/230, 372.2, 384, 444
See application file for complete search history.

(56) References Cited

U.S. PATENT DOCUMENTS

| | | | |
|---|---|---|---|
| 4,811,787 A | 3/1989 | Navratil et al. | |
| 4,939,203 A * | 7/1990 | Marrocco | C09K 8/512 524/557 |
| 5,081,314 A | 1/1992 | Kissel et al. | |
| 5,480,933 A | 1/1996 | Fox et al. | |
| 6,387,986 B1 * | 5/2002 | Moradi-Araghi | C09K 8/516 523/211 |
| 9,523,045 B2 | 12/2016 | Harrington et al. | |
| 2008/0146852 A1 | 6/2008 | Dubois et al. | |
| 2008/0214880 A1 | 9/2008 | Dubois et al. | |
| 2009/0192053 A1 * | 7/2009 | Crews | C09K 8/516 507/201 |
| 2011/0124493 A1 | 5/2011 | Kuperman et al. | |

(Continued)

FOREIGN PATENT DOCUMENTS

CN          201832629 U      5/2011

OTHER PUBLICATIONS

Haas, Paul A. et al., "Preparation of Metal Oxide Gel Spheres with Hexamethylenetetramine as an Ammonia Donor" Industrial & Engineering Chemistry, Product Research and Development (1983) 22(3): 461-466.

(Continued)

*Primary Examiner* — William P Fletcher, III
(74) *Attorney, Agent, or Firm* — Eric D. Babych; Barnes & Thornburg LLP

(57) ABSTRACT

Methods and systems for converting inactive chemicals into active chemicals in-situ for treating oil and gas pipelines, other industrial systems, or sanitizing surfaces. Also, methods of treating an oil and gas pipeline including feeding an inactive additive through a first conduit and into a second conduit, the second conduit is in fluid communication with the first conduit and the oil and gas pipeline. The inactive additive is converted into an active additive within the second conduit and introduced into the oil and gas pipeline.

10 Claims, 5 Drawing Sheets

(56) References Cited

U.S. PATENT DOCUMENTS

| | | | |
|---|---|---|---|
| 2011/0146974 A1* | 6/2011 | Hartshorne | C09K 8/035 |
| | | | 166/250.12 |
| 2011/0315382 A1* | 12/2011 | Hutchins | C09K 8/512 |
| | | | 166/295 |
| 2014/0262297 A1 | 9/2014 | Huang | |
| 2015/0197665 A1 | 7/2015 | Hsieh et al. | |
| 2015/0298105 A1 | 10/2015 | Choi et al. | |
| 2015/0343430 A1 | 12/2015 | Kim et al. | |
| 2016/0032170 A1* | 2/2016 | Li | C09K 8/588 |
| | | | 166/305.1 |
| 2016/0177226 A1 | 7/2016 | Bennett et al. | |
| 2016/0312141 A1 | 10/2016 | Rana et al. | |
| 2017/0066976 A1 | 3/2017 | Jones et al. | |
| 2017/0145292 A1* | 5/2017 | Szalai | C09K 8/588 |
| 2017/0198225 A1 | 7/2017 | Bailey et al. | |
| 2018/0051217 A1* | 2/2018 | Weers | C07C 7/005 |

OTHER PUBLICATIONS

Steinmetz, Scott A. et al., "Acrolein and other volatile organic emissions from the combustion of crude glycerol" Fall Technical Meeting of the Eastern States Section of the Combustion Institute (2011) 676-681.

* cited by examiner

IN-LINE CHEMICAL HEATING FOR IN-SITU GENERATION OF ACTIVE CHEMICALS

BACKGROUND

1. Field of the Invention

The present disclosure generally relates to in-situ generation of active chemicals. More particularly, the disclosure pertains to methods and systems for converting inactive chemicals into active chemicals in-situ for treating oil and gas pipelines or other industrial systems.

2. Description of the Related Art

Oilfield treatment chemicals are widely used to attend to an array of problems in the various processes of drilling, transportation, storage and refining in the oil and gas industry. Examples of chemicals used include corrosion inhibitors, oxygen scavengers, biocides, hydrogen sulfide scavengers, hydrate inhibitors, scale inhibitors, demulsifiers, paraffin inhibitors, wax inhibitors, flow improvers, foamers, and antifoams. These chemicals are usually applied via direct injection of a liquid chemical product from a storage tank into the pipeline stream.

Some chemicals are known to be effective in certain applications; however, the risks associated with handling hazardous chemicals limit or altogether prevent their use. For example, acrolein is known to be an effective hydrogen sulfide scavenger, but acrolein and many hydrogen sulfide scavengers are also known to be toxic and are more complicated to handle than other oilfield treatment chemicals. Formaldehyde, amongst other chemicals, is known to be an effective biocide. However, formaldehyde and many biocides are also known to be more toxic and less safe than other oilfield treatment chemicals.

BRIEF SUMMARY

In some embodiments, a method of treating an oil and gas pipeline is disclosed. The method may include feeding an inactive additive through a first conduit and into a second conduit, wherein the second conduit is in fluid communication with the first conduit and the second conduit is connected to the oil and gas pipeline; converting the inactive additive into an active additive within the second conduit; and introducing the active additive into the oil and gas pipeline.

In some embodiments, the inactive additive may be glycerol, methanol, triazine, hexamethylenetetramine, or any combination thereof.

In some embodiments, the inactive additive may be glycerol.

In some embodiments, the inactive additive may be methanol.

In some embodiments, the inactive additive may be triazine.

In some embodiments, the inactive additive may be hexamethylenetetramine.

In some embodiments, the active additive may be acrolein, formaldehyde, ammonia, or any combination thereof.

In some embodiments, the step of converting the inactive additive into the active additive includes heating the second conduit.

In some embodiments, the step of converting the inactive additive into the active additive includes heating a medium flowing through the second conduit to a temperature of from about 50° C. to about 500° C.

In some embodiments, the first conduit may include a one-way valve.

In some embodiments, the second conduit may include a one-way valve.

In some embodiments, the second conduit may include a catalyst.

In some embodiments, the second conduit may include a heating device.

In some embodiments, the heating device may include a heating cable.

In some embodiments, the method may include determining a temperature of a medium flowing through the second conduit.

In other embodiments, a system for treating an oil and gas pipeline is disclosed. The system may include a first conduit; a second conduit in fluid communication with the first conduit and the second conduit is connected to the oil and gas pipeline; a heating device positioned adjacent to the second conduit.

In some embodiments, the system may include an inactive additive disposed within the first conduit.

In some embodiments, the system may include an active additive disposed within the second conduit.

In other embodiments, a method of treating a surface or an aqueous solution is disclosed. The method can include feeding a composition comprising glycerol through a first conduit and into a second conduit, wherein the second conduit is in fluid communication with the first conduit and the surface or the aqueous solution; converting the glycerol into acrolein within the second conduit; and introducing the acrolein onto the surface or into the aqueous system.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

A detailed description of the invention is hereafter described with specific reference being made to the drawings in which.

DETAILED DESCRIPTION

Various embodiments are described below. The relationship and functioning of the various elements of the embodiments may better be understood by reference to the following detailed description. However, embodiments are not limited to those illustrated below. In certain instances, details may have been omitted that are not necessary for an understanding of embodiments disclosed herein.

Figure 1:
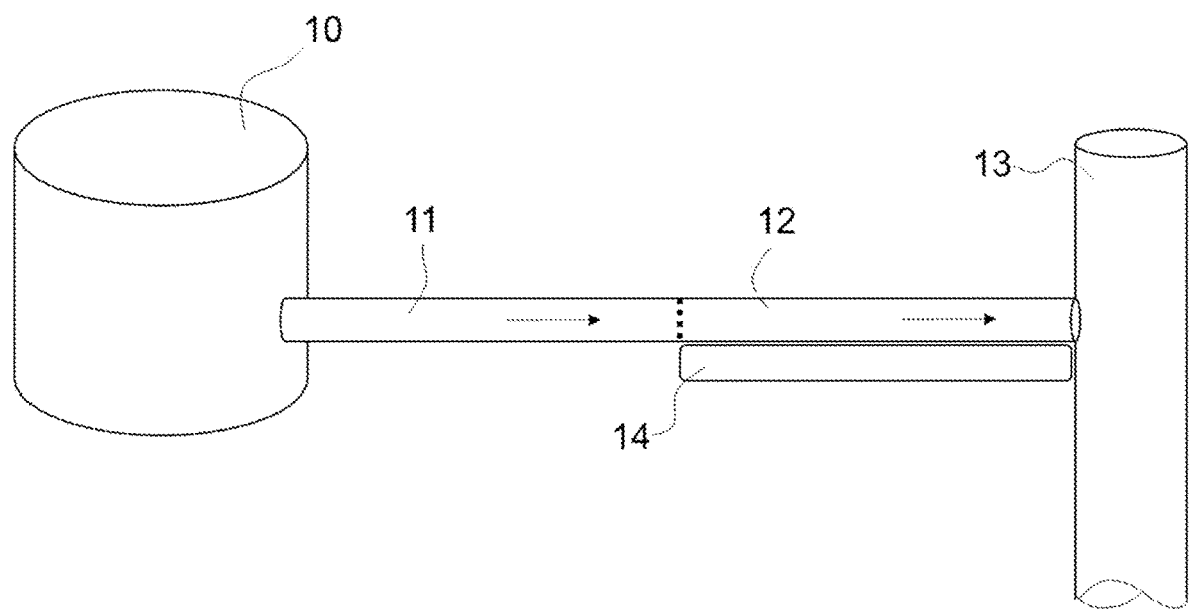
FIG. 1 shows a schematic of an embodiment of a chemical heating apparatus.

FIG. 1 shows a tank 10 for storing or feeding an inactive additive into the first conduit 11. Conversion of the inactive additive into an active additive may occur in the second conduit 12. A heating device 14 may be positioned adjacent to the second conduit 12. The heating device 14 provides sufficient heat to the second conduit 12 to convert the inactive additive into an active additive. The active additive is then introduced into an oil and gas pipeline 13. As used herein "oil and gas pipeline" refers to any pipe carrying oil or gas, including wellbores or subterranean formations.

As used herein an "inactive additive" refers to chemical that is less effective at the same dosage level than an "active additive" into which the inactive additive is converted. For example, the active additive may be a corrosion inhibitor that reduces the corrosion rate of metal, whereas the inactive additive may not reduce the corrosion rate of the metal if added at the same dosage as the active additive. In some embodiments, the inactive additive may be about 0% to about 90% as effective as the active additive. In some embodiments, the inactive additive may be about 0% to about 80%, about 0% to about 70%, about 0% to about 60%, about 0% to about 50%, about 0% to about 40%, about 0% to about 30%, about 0% to about 20%, or about 0% to about 10% as effective as the active additive. In some embodiments, the inactive additive may be 0% as effective as the active additive.

The inactive additive is not limited to those additives disclosed in the present disclosure. Inactive additives include any chemical compounds or compositions that breakdown or decompose into an active additive, such as a compound or composition that has greater efficacy than the inactive additive.

The heating device may be any device that is capable of heating the fluid inside the second conduit. Pipe heating can be accomplished by various means, such as using thermal, microwave, or laser devices. For example, commercially available heat tracing and line heating products can be used, such as Thermon's MIQ™ mineral insulated cables that can maintain the temperature of a conduit up to about 500° C. (932° F.). The cables convert electrical energy to heat and are manufactured using Alloy 825, a high nickel/chromium alloy ideally suited for high temperature service that offers exceptional resistance to stress corrosion in chloride, acid, salt and alkaline environments.

In some embodiments, the second conduit may be a double containment pipe where an inner pipe is disposed within a second pipe with a larger diameter. The additive can be fed through the inner pipe and a heating fluid may be fed through the second pipe to heat the inner pipe. The heating fluid may be steam. In some embodiments, the heating device may be the second pipe with a larger diameter than the inner pipe of a double containment pipe.

In some embodiments, a method of treating an oil and gas pipeline may include feeding an inactive additive through a first conduit 11 and into a second conduit 12, wherein the second conduit 12 is in fluid communication with the first conduit 11 and the oil and gas pipeline 13. The method includes converting the inactive additive into an active additive within the second conduit 12. The method also includes introducing the active additive into the oil and gas pipeline 13.

In some embodiments, the second conduit is not connected to an absorber or any other type of separation unit. Once the active additive exits the second conduit, it can be immediately introduced into an oil and gas pipeline, applied onto a surface, or introduced into an aqueous system without passing through an absorber.

In some embodiments, there are no components between the second conduit and the oil and gas pipeline. As such, the active additive exits the second conduit and flows directly into the oil and gas pipeline without passing through and/or by any other components.

Figure 2:
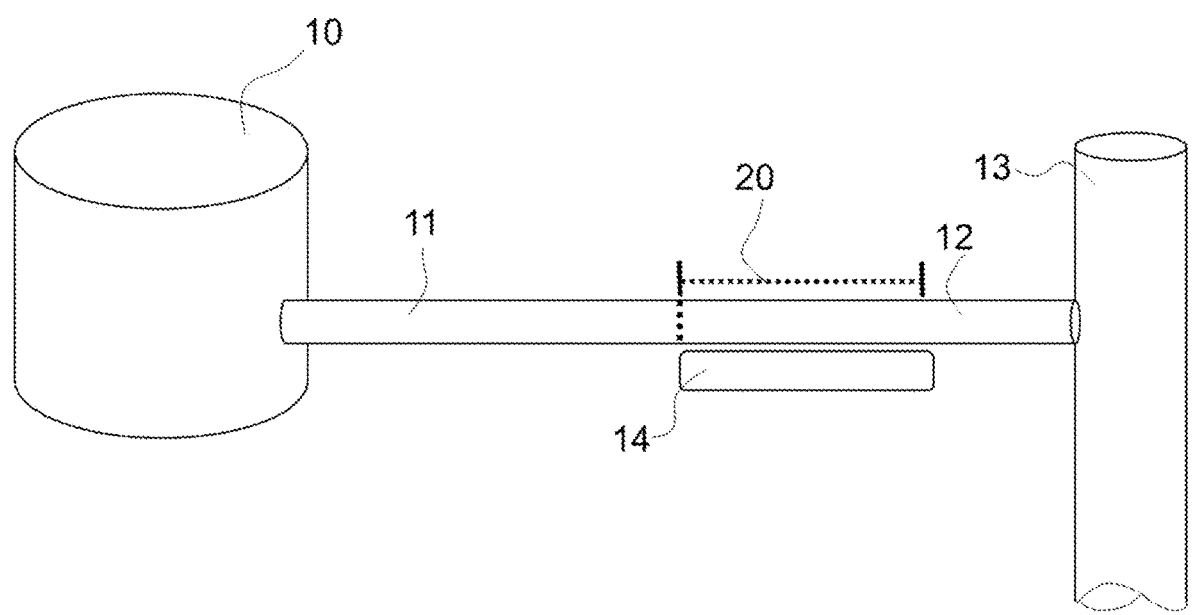
FIG. 2 shows a schematic of an embodiment of a chemical heating apparatus.
Figure 3:
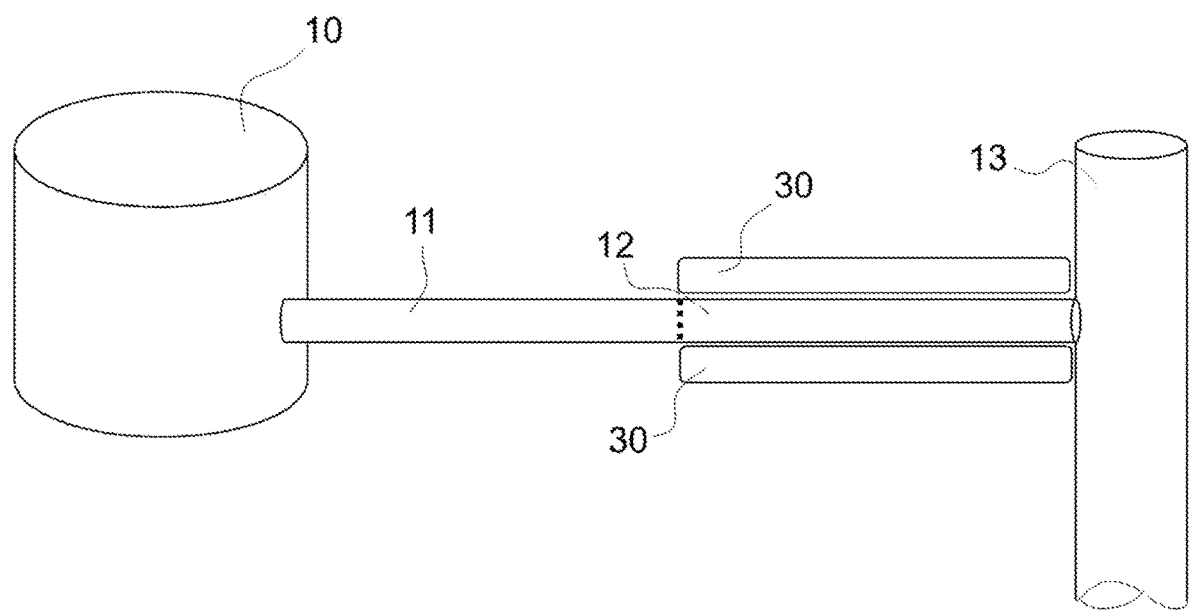
FIG. 3 shows a schematic of an embodiment of a chemical heating apparatus.

FIG. 2 shows an embodiment where the heating device 14 may be adjacent to a portion 20 of the second conduit 12. FIG. 3 shows an embodiment where there are multiple heating devices 30 adjacent to the second conduit 12. The arrangement of the heating devices adjacent to the second conduit is not critical, and one of skill in the art, without undue experimentation, could arrange the heating device to ensure proper heating of the second conduit 12.

In some embodiments, the inactive additive may be glycerol, methanol, triazine, hexamethylenetetramine, or any combination thereof.

In some embodiments, converting the inactive additive into the active additive includes heating the second conduit. In some embodiments, at least a portion of the inactive additive is converted into an active additive.

In some embodiments, the active additive may be acrolein, formaldehyde, ammonia, or any combination thereof.

When glycerol is heated to a temperature of about 280° C., acrolein and water are produced. Acrolein can be added directly to oil, gas, or water to react with and remove hydrogen sulfide. Acrolein is electrophilic and reacts with thiols, while glycerol does not react with thiols under the same conditions.

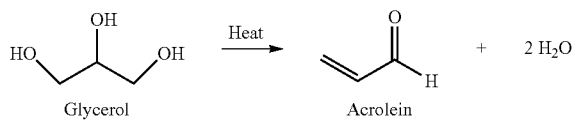

In some embodiments, the method may include heating a medium flowing through the second conduit to a temperature of from about 50° C. to about 500° C. The medium may be heated to a temperature of about 280° C., about 250° C., about 200° C., or about 300° C. In some embodiments, the medium may be heated to a temperature of about 200° C. to about 300° C. The medium may comprise the inactive additive.

In some embodiments, the inactive additive may be methanol and the active additive may be formaldehyde. Methanol decomposes into formaldehyde and hydrogen when heated to a temperature above about 250° C. Formaldehyde can be used as an effective biocide.

Alternatively, formaldehyde can be generated by heating triazine. At temperatures greater than about 250° C., triazine breaks down into formaldehyde and a primary amine. In some embodiments, the inactive additive may be triazine and the active additive may be formaldehyde.

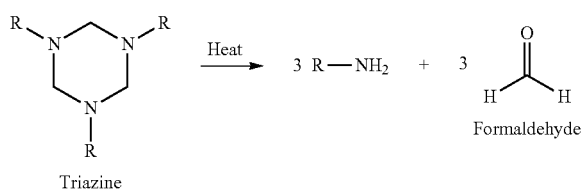

Triazine → 3 R—NH₂ + 3 Formaldehyde

In some embodiments, the active additive may be a corrosion inhibitor. Amines and ammonia neutralize acidic solutions and can control corrosive environments. For example, ammonia can raise the pH of a fluid by neutralizing acids.

Hexamethylenetetramine (HMTA) is commonly generated by reacting ammonia with formaldehyde. At high temperatures, HMTA breaks down into its constituent parts of ammonia and formaldehyde. At temperatures of between about 200 to 300° C., HMTA decomposition produces mainly ammonia and formaldehyde. In turn, the ammonia generated can raise the pH to neutralize acidic fluids. Ammonia vapors may assist in neutralizing acidic fluids in "top-of-the-line" (TOL) corrosion, which is known to be particularly difficult to mitigate with conventional continuous corrosion inhibitors.

Ammonia ($NH_3$) is an inorganic compound that boils at −28° F. at a pressure of 1 atmosphere. The ammonia gas comes into contact with the hydrocarbons in a subterranean formation and reacts in-situ with naphthenic acid in the hydrocarbons to form surfactants. These surfactants are water-wetting and oil emulsifying, thereby facilitating the formation of an oil-in-water emulsion. The oil-in-water emulsion has a much lower viscosity that an oil continuous phase, such that the emulsion drains efficiently from the formation.

In some embodiments, the first conduit may have a one-way valve. In some embodiments, the second conduit may have a one-way valve.

To decrease the temperature to which the medium is heated, a catalyst can be used. Catalytic material can be deposited on a porous monolith support, and the support can be disposed within the second conduit. The inactive additive may flow into the second conduit, contact the catalyst, and convert into an active additive at a lower temperature compared to heating the inactive additive in the absence of catalyst. In some embodiments, the second conduit may include a catalyst.

In some embodiments, the second conduit may include a heating device. In some embodiments, the heating device may be a heating cable.

In some embodiments, the method may include determining a temperature of a medium flowing through the second conduit. The temperature of the medium can be determined using any means available to one of ordinary skill in the art. For example, a thermocouple may be inserted through the wall of the second conduit to directly measure the medium temperature. Alternatively, the correlation between the medium temperature and the temperature of the wall of the second conduit could be determined, so that a thermocouple could measure the temperature of the wall of the second conduit to determine the medium temperature.

In other embodiments, a system for treating an oil and gas pipeline is disclosed. The system includes a first conduit; a second conduit in fluid communication with the first conduit and with the oil and gas pipeline; and a heating device positioned adjacent to the second conduit.

In some embodiments, the system may include an inactive additive disposed within the first conduit.

In some embodiments, the system may include an active additive disposed within the second conduit.

Figure 4:
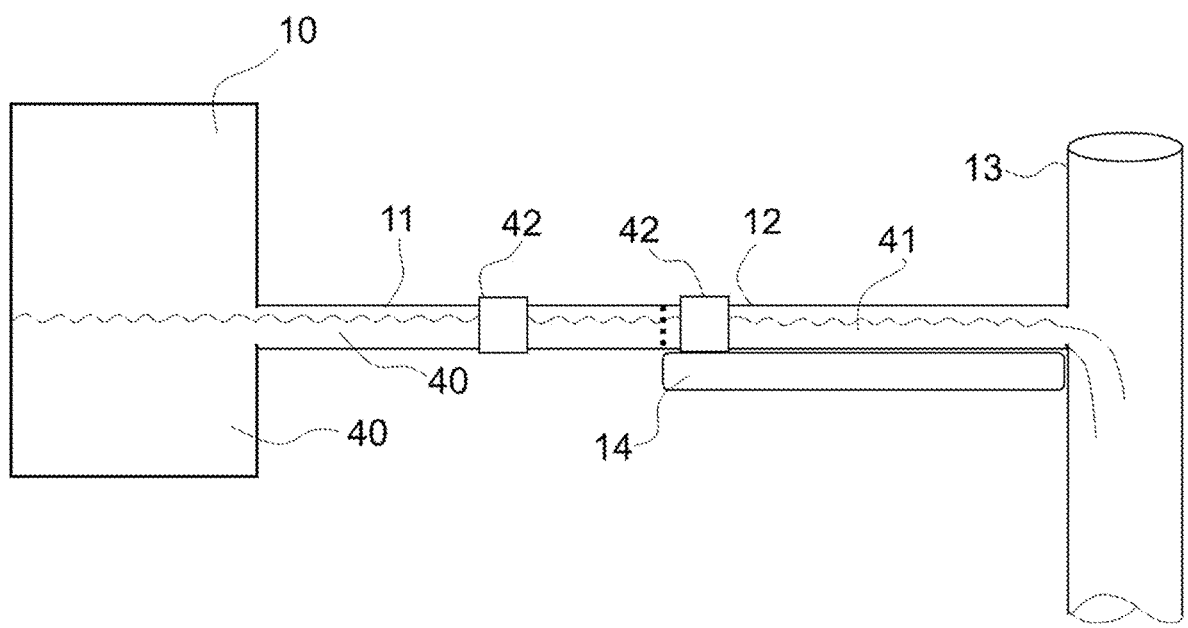
FIG. 4 shows a schematic of a chemical heating system.

FIG. 4 shows one embodiment of the system disclosed herein. The first conduit 11 is in fluid communication with the second conduit 12. The second conduit 12 is in fluid communication with an oil and gas pipeline 13. The inactive additive 40 may be disposed within the first conduit 11 and stored in a tank 10. The active additive 41 may be disposed within the second conduit 12. One-way valves 42 prevent the active additive 41 from flowing back into the first conduit 11. FIG. 4 depicts two one-way valves 42, but the system may include a single one-way valve 42 at the connection between the first conduit 11 and the second conduit 12.

Figure 5:
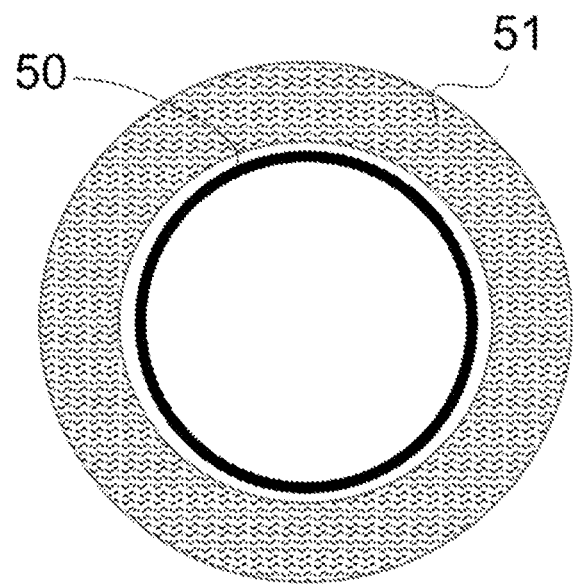
FIG. 5 shows a cross-sectional view of an embodiment for the second conduit.

FIG. 5 shows an embodiment where the heating device 51 surrounds the second conduit 50. The heating device 51 may be a cable that is circumferentially wrapped around the second conduit 50.

In an optional configuration, the active additive may be introduced into the subterranean formation through an injection well. In another optional configuration, the active additive may be introduced into the subterranean formation through an injection well, and the production well is a horizontal well disposed below the injection well. In some embodiments, a plurality of ports may also be used to inject the active additive into a system at various locations. The system may be an oil and gas pipeline or any industrial process where the active additive may be used. For example, the system and methods disclosed herein may be applied to papermaking processes.

In other embodiments, a method of treating a surface or an aqueous solution is disclosed. The method can include feeding a composition comprising glycerol through a first conduit and into a second conduit, wherein the second conduit is in fluid communication with the first conduit and the surface or the aqueous solution; converting the glycerol into acrolein within the second conduit; and introducing the acrolein onto the surface or into the aqueous system.

In some embodiments, the acrolein can be introduced onto the surface of food processing equipment.

In some embodiments, the acrolein can be introduced onto the surface of bedrails, handles, floors, walls, carts, IV stands, wheelchairs, surgical procedure instruments, diagnostic procedure instruments such as, for example, endoscopes, and general instruments such as, for example, stethoscopes and thermometers.

The present methods are applicable to all industries that employ water treatment processes. For example, the different types of industrial processes in which the compositions of the present invention can be applied generally include raw water processes, waste water processes, industrial water processes, municipal water treatment, food and beverage processes, pharmaceutical processes, electronic manufacturing, utility operations, pulp and paper processes, mining and mineral processes, transportation-related processes, textile processes, plating and metal working processes, laundry and cleaning processes, leather and tanning processes, and paint processes.

In particular, food and beverage processes can include, for example, dairy processes relating to the production of cream, low-fat milk, cheese, specialty milk products, protein isolates, lactose manufacture, whey, casein, fat separation, and brine recovery from salting cheese. Uses relating to the beverage industry include, for example, fruit juice clarification, concentration or deacidification, alcoholic beverage clarification, alcohol removal for low-alcohol content beverages, process water; and uses relating to sugar refining, vegetable protein processing, vegetable oil production/processing, wet milling of grain, animal processing (e.g., red meat, eggs, gelatin, fish and poultry), reclamation of wash waters, food processing waste and the like.

The methods are useful for biocide control in of containers, processing facilities, or equipment in the food service or food processing industries. The methods have particular value for use on food packaging materials and equipment. Examples of process facilities in which the methods can be employed include a milk line dairy, a continuous brewing system, food processing lines such as pumpable food systems and beverage lines, ware wash machines, low temperature ware wash machines, dishware, bottle washers, bottle chillers, warmers, third sink washers, processing equipment such as tanks, vats, lines, pumps and hoses (e.g., dairy processing equipment for processing milk, cheese, ice cream and other dairy products), and transportation vehicles. The methods and active additives can be used to inhibit corrosion in tanks, lines, pumps, and other equipment used for the manufacture and storage of soft drink materials, and also used in the bottling or containers for the beverages.

The methods and active additives of the present application can be used to sanitize a surface. For example, the active additive can be acrolein and it can be added onto a surface as a biocide. The active additive can be added onto any surface in need of sanitization such as, for example, a surface of food processing equipment that contacts food. The methods disclosed herein can be used to sanitize surfaces in a variety of industries, such as food and beverage, healthcare, packaging, warewashing, water treatment, geothermal, and oil and gas.

The methods and compositions of the present disclosure can be used to sanitize surfaces in hospitals or clinics where sanitization is critical for preventing cross contamination. The surfaces that can be sanitized included but are not limited to bedrails, handles, floors, walls, carts, IV stands, wheelchairs, surgical procedure instruments, diagnostic procedure instruments such as, for example, endoscopes, and general instruments such as, for example, stethoscopes and thermometers.

The methods and active additives can be used on or in industrial equipment and in industrial process streams such as heaters, cooling towers, boilers, retort waters, rinse waters, aseptic packaging wash waters, and the like. The compositions can be used to treat surfaces in recreational waters such as in pools, spas, recreational flumes and water slides, fountains, and the like.

The methods and active additives can be used to inhibit the corrosion of metal surfaces contacted with cleaners found in janitorial and/or housekeeping applications, food processing equipment and/or plant applications, and in laundry applications. For example, the corrosion of washers, such as tunnel washers for washing textiles, may be inhibited according to methods disclosed herein.

Examples of waste water treatment applications include, for example, industrial waste water treatment, biological-waste treatment systems, removal of heavy metal contaminants, polishing of tertiary effluent water, oily waste waters, transportation related processes (e.g., tank car wash water), textile waste (e.g., dye, adhesives, size, oils for wool scouring, fabric finishing oils), plating and metal working waste, laundries, printing, leather and tanning, pulp and paper (e.g., color removal, concentration of dilute spent sulfite liquor, lignin recovery, recovery of paper coatings), chemicals (e.g., emulsions, latex, pigments, paints, chemical reaction byproducts), and municipal waste water treatment (e.g., sewage, industrial waste).

A fluid to which the compositions may be introduced may be an aqueous medium. In certain embodiments, the aqueous medium may comprise water, gas, and optionally liquid hydrocarbon. A fluid to which the compositions may be introduced may be a liquid hydrocarbon. The liquid hydrocarbon may be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene. In certain embodiments, the fluid or gas may be a refined hydrocarbon product.

The disclosed methods have many advantages over prior methods of delivering active additives such as acrolein. The active additives disclosed herein pose challenges in storage and handling due to their toxicity. The disclosed methods minimize storage and handling of potentially hazardous chemicals, thereby improving safety and decreasing negative environmental effects. In addition, the active additives can be produced on an as-needed basis on-site without the need to transport or store the active additives.

Any composition disclosed herein may comprise, consist of, or consist essentially of any of the compounds/components disclosed herein. In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

As used herein, the term "about" refers to the cited value being within the errors arising from the standard deviation found in their respective testing measurements, and if those errors cannot be determined, then "about" refers to within 10% of the cited value.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a valve" is intended to include "at least one valve" or "one or more valves."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of treating an oil and gas pipeline, comprising:
   feeding an inactive additive through a first conduit and into a second conduit, wherein the second conduit is in fluid communication with the first conduit and is connected to the oil and gas pipeline;
   converting the inactive additive into an active additive within the second conduit; and
   introducing the active additive into the oil and gas pipeline, wherein the inactive additive is selected from the group consisting of glycerol, methanol, triazine, hexamethylenetetramine, and any combination thereof.

2. The method of claim 1, wherein the active additive is acrolein, formaldehyde, ammonia, or any combination thereof.

3. The method of claim 1, wherein converting the inactive additive into the active additive comprises heating the second conduit.

4. The method of claim 1, wherein converting the inactive additive into the active additive comprises heating a medium flowing through the second conduit to a temperature of from about 50° C. to about 500° C.

5. The method of claim 1, wherein the second conduit comprises a one-way valve.

6. The method of claim 1, wherein the second conduit comprises a catalyst.

7. The method of claim 1, wherein the second conduit comprises a heating device.

8. The method of claim 1, further comprising determining a temperature of a medium flowing through the second conduit.

9. A method of treating an oil and gas pipeline, comprising:
   feeding an inactive additive through a first conduit and into a second conduit, wherein the second conduit is in fluid communication with the first conduit and is connected to the oil and gas pipeline;
   converting the inactive additive into an active additive within the second conduit; and
   introducing the active additive into the oil and gas pipeline, wherein converting the inactive additive into the active additive comprises heating the second conduit.

10. A method of treating an oil and gas pipeline, comprising:
    feeding an inactive additive through a first conduit and into a second conduit, wherein the second conduit is in fluid communication with the first conduit and is connected to the oil and gas pipeline;
    converting the inactive additive into an active additive within the second conduit; and
    introducing the active additive into the oil and gas pipeline, wherein the second conduit comprises a catalyst.

* * * * *